(12) United States Patent
Hicken

(10) Patent No.: US 9,879,752 B1
(45) Date of Patent: Jan. 30, 2018

(54) SPRING LOADED SPROCKET CARRIER

(71) Applicant: David Hicken, Callahan, FL (US)

(72) Inventor: David Hicken, Callahan, FL (US)

( * ) Notice: Subject to any disclaimer, the term of this patent is extended or adjusted under 35 U.S.C. 154(b) by 0 days.

(21) Appl. No.: 15/336,843

(22) Filed: Oct. 28, 2016

(51) Int. Cl.
*F16D 3/00* (2006.01)
*F16H 55/14* (2006.01)
*F16H 55/36* (2006.01)
*F16F 15/123* (2006.01)
*F16H 55/30* (2006.01)
*F16F 15/124* (2006.01)

(52) U.S. Cl.
CPC ...... *F16F 15/1232* (2013.01); *F16F 15/1245* (2013.01); *F16H 55/14* (2013.01); *F16H 55/30* (2013.01); *F16H 2055/306* (2013.01)

(58) Field of Classification Search
CPC .... F16H 2055/366; F16H 55/36; F16H 55/14; F16D 3/66; F16F 15/123
USPC .......................................................... 474/94
See application file for complete search history.

(56) References Cited

U.S. PATENT DOCUMENTS

| 4,512,216 A | 4/1985 | Callegari |
| 7,344,463 B2 | 3/2008 | Reiter |
| 2010/0009794 A1 | 1/2010 | Chiang |

*Primary Examiner* — Henry Y Liu
(74) *Attorney, Agent, or Firm* — Lawrence J. Gibney; Mitchell Ghaneie

(57) ABSTRACT

A device that will allow a go kart to smoothly accelerate and decelerate particularly during racing the go cart. This device once assembled will allow the gradual absorption of shock on the drive chain as it rotates around thereby, rotating the axle of the go kart.

14 Claims, 5 Drawing Sheets

SPRING LOADED SPROCKET CARRIER

BACKGROUND OF THE INVENTION

A. Field of the Invention

This device relates to a sprocket carrier that may be applied to drive chain and sprocket assemblies to absorb tension on the drive chain.

B. Prior Art

This is a device that will be used within the go kart industry and among other industries that utilize drive chain and sprocket assemblies. Go karts are often devices that are powered by a gasoline engine. The engine itself will drive a sprocket with a set of gear teeth. A drive chain will be used to connect the gasoline engine with the back right tire of the go cart. It is important to be able to accelerate consistently around curves to increase performance.

Professional go kart racing is typically done on an oval track and the winner of a particular race is usually determined by the time that it takes for the driver to move around the track. This is a device that will prevent or eliminate the rapid shock or jerk on the drive chain when the go kart is rapidly accelerated or decelerated, which often occurs in this type of racing. In the past, the chain is loosened in order to accommodate the shock or jerk on the drive chain. Without being compromised. If the chain breaks, the go kart stops. However, because the drive chain is loosened, thereby allowing slack on the chain, there is a small period of time between when the accelerator is pressed and the go kart's wheels begin to rotate. Accordingly, during this period of time the slack in the drive chain is taken up. The chain eventually becomes tight enough to rotate the sprocket which is attached to the axle that rotates the back wheels.

BRIEF SUMMARY OF THE INVENTION

The presently claimed device is described to be used on go kart applications. However, it may also be used in snowmobile applications and in particular any applications that require a drive chain and sprocket assembly. One of the purposes of the device is to prevent damage to the drive chain which links the engine to the sprocket which is attached to the vehicle's axle and ensures a smooth transition while the driver or the operator of the vehicle accelerates. It will be comprised of two primary pieces and a variety of components including a first flange, a second flange, as well as a plurality of springs which are encapsulated into openings in the sprocket.

As the drive chain is rapidly accelerated, the sprocket carrier will in turn rotate causing a compression of the springs as they move within the recess portions. This allows for acceleration without causing any undue jerks or shocks to the drive chain.

NUMBERING REFERENCE

Figure 1:
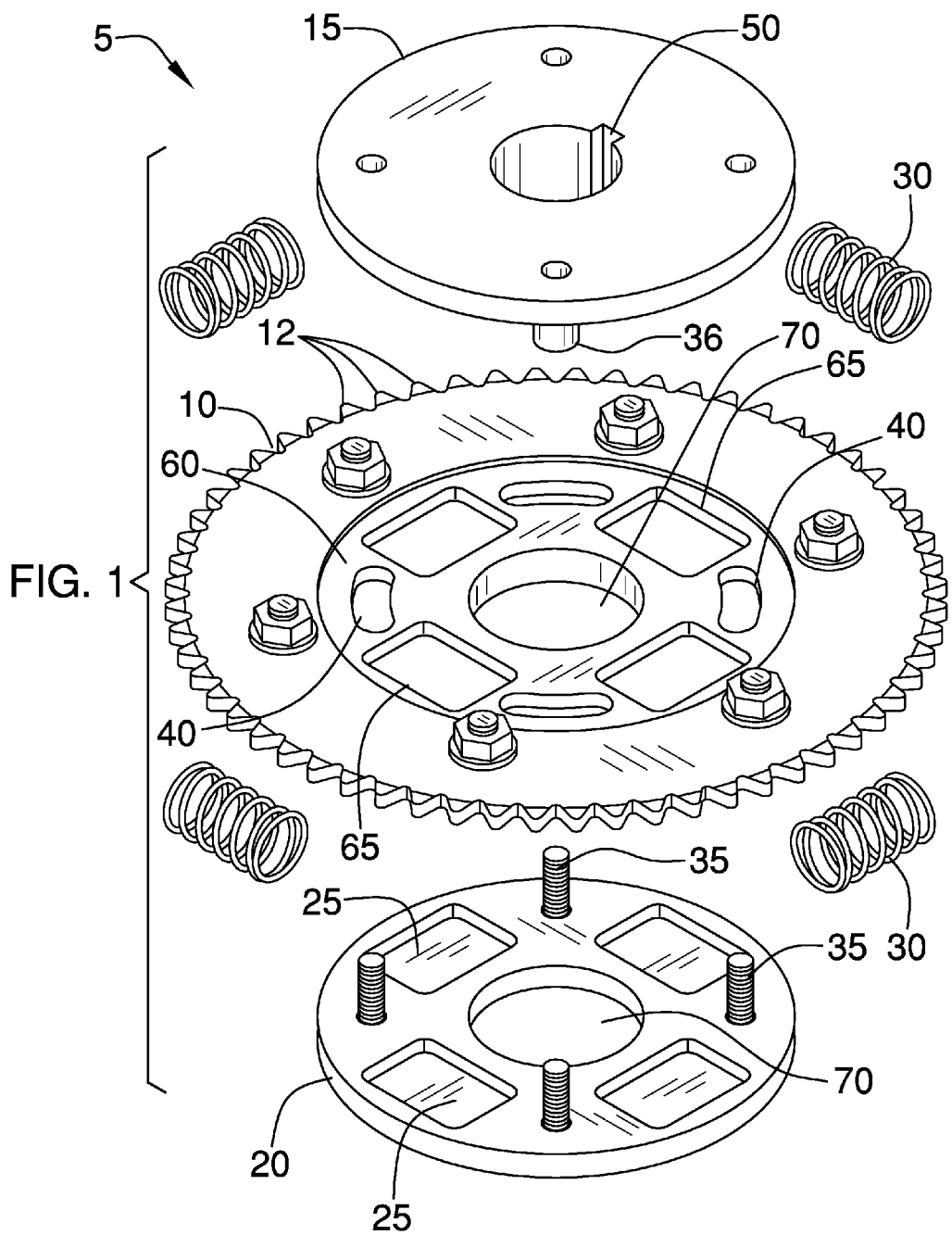
FIG. 1 is an exploded top view of the device.

5 Device
10 Sprocket
12 Teeth
15 First flange
20 Second flange
25 Recess
30 Spring
35 Bolt
36 Socket
40 Elliptical opening
50 Keyway for axle
51 Protrusion
60 Sprocket holder
65 Rectangular opening
70 Circular opening

DETAILED DESCRIPTION OF THE EMBODIMENTS

This device 5 is described as being used within a go kart, but could be applied in many other vehicles, such as but not limited to a snowmobile, motorcycle or dirt bike. The device 5 is comprised of the following: a first flange 15, a second flange 20, a plurality of shock absorbers, such as a spring 30; a plurality of bolts 35, and a sprocket holder 60.

The sprocket holder 60 is further comprised of a first side, a second side, a plurality of elliptical openings 40, a plurality of rectangular openings 65, and a circular opening 70. The sprocket holder 60 bolts to the sprocket 10 with a plurality of bolts and nuts which can be seen in FIG. 1. The rectangular openings 65 accommodate the springs 30.

Figure 2:
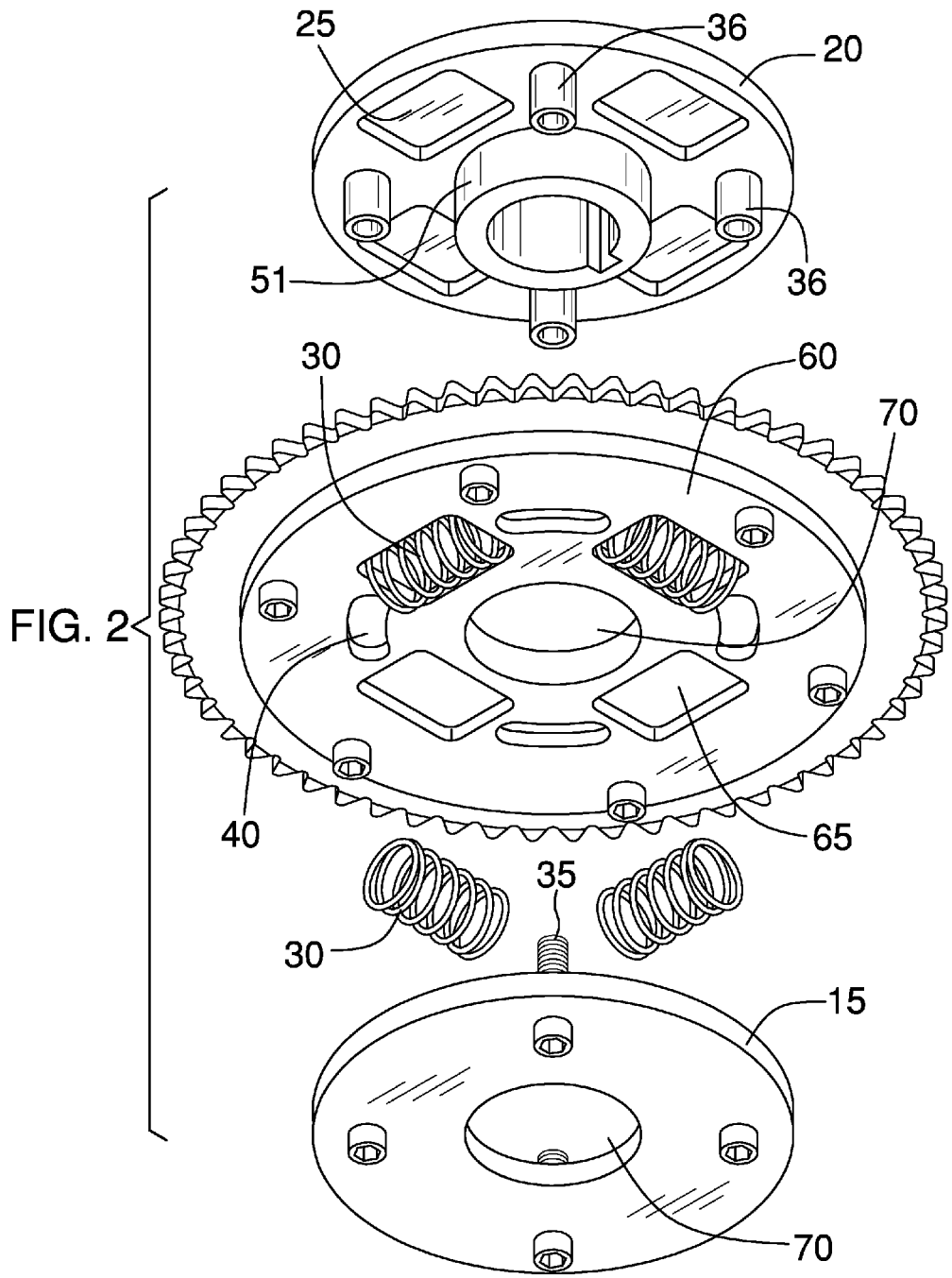
FIG. 2 is a bottom exploded view of the device.

The first flange 15 is further comprised of a plurality of recesses 25, a plurality of sockets 36 that provide internal threads, and keyway a 50. The keyway 50 provides an internal notch to lock on to the rear axle of the go kart, which can be seen in FIG. 1 and FIG. 2. FIG. 2 also shows that the outside surface of the keyway is cylindrical. The second flange 20 is further comprised of a plurality of recesses 25, a plurality of threaded bolts 35, and a circular opening 70.

Figure 3:
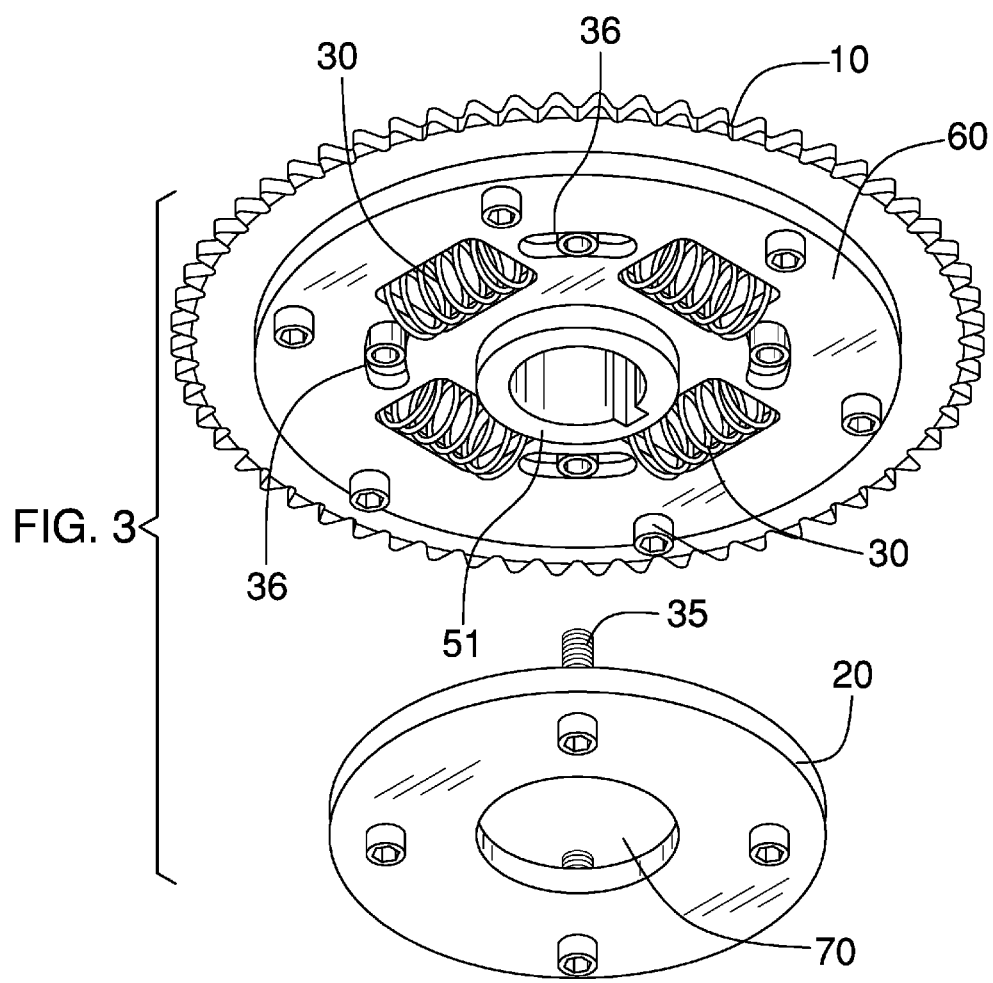
FIG. 3 is a fragmented view of the device with the first flange in place.
Figure 4:
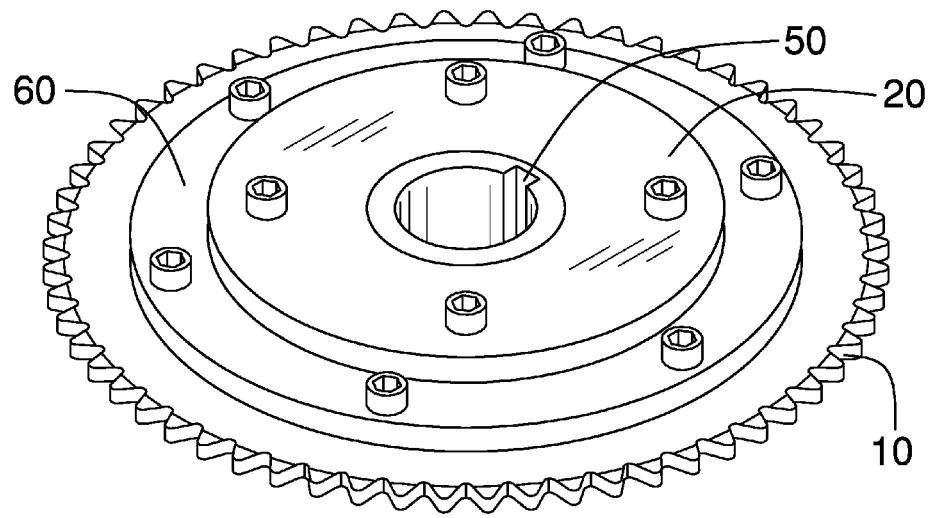
FIG. 4 is a bottom view of the assembled device.
Figure 5:
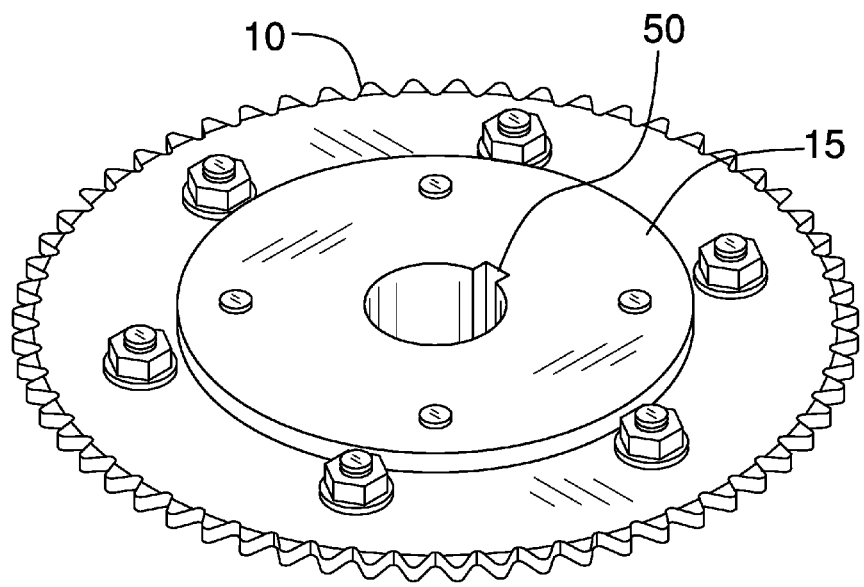
FIG. 5 is a top view of the assembled device.
Figure 6:
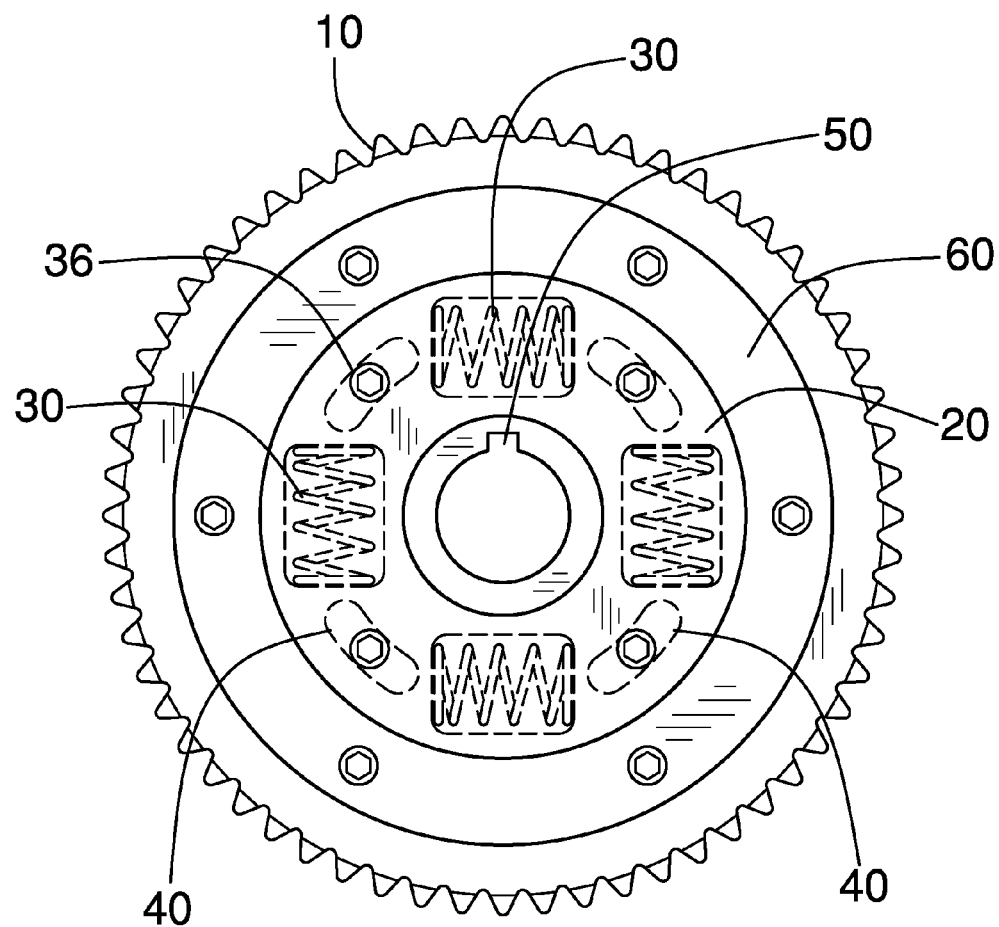
FIG. 6 is a cross-sectional view of the device showing internal components.

The sprocket 10, sprocket holder 60, first flange 15, second flange 20 all mount together with the bolts 35 and encapsulate the plurality of springs 30. It can be seen how the above pieces of the device 5 mount together in FIG. 2, FIG. 3, and FIG. 6. A method of attaching the pieces together first begins with placing a plurality of springs 30 into each rectangular opening 65. Then placing each socket 36 of the first flange 15 through the each elliptical opening 40 of the sprocket holder 60 and placing each recess 25 of the first flange 15 over each spring 30. The first flange 15 meets with the first side of the sprocket holder 60. The third step is placing the second flange 20 over the second side of the sprocket holder 60 so that each bolt 35 of the second flange 20 thread into each socket 36 and each recess 25 of the second flange 20 cover each spring 30. When the device 5 is bolted together, the protrusion 51 extends through the circular opening 70 of the sprocket holder 60 and the circular opening 70 of the second flange 20.

The axle of the go kart will be inserted through the first flange 15, second flange 20, sprocket holder 60 and will be secured to the device using a key (not depicted through the keyway member) that fits the keyway 50.

When the drive chain of the go kart is rapidly accelerated, it will force a rotation of the sprocket 10 and sprocket holder 60 against each spring 30. Depending on the type of spring 30, the sockets 36 may or may not travel along the full distance of the elliptical opening 40. The springs will absorb the jerking force on the drive chain and on the teeth 12 of the sprocket 10 prior to the drive chain forcing the first flange 15 and thus the axle to rotate. On first flange 15 thereby causing the sockets 36 to move within the elliptical openings 40 and therefore causing compression of the springs 30 to the recessed numbers 25.

Although four springs 30 and four sockets 36 are depicted and described, the device may also be comprised of one spring 30 and one socket 36. There may also be a different number of sockets 36 or springs 30. Additionally, the type of spring may be changed depending on the characteristics of the rider or the characteristics of the vehicle that the device is installed on. Furthermore, foam, rubber, or other material with shock absorbing properties may be provided as an alternative to the spring.

Furthermore, while the presented invention is described to be used with a sprocket 10 and drive chain, it is anticipated that the device may be modified to accommodate a drive belt. Certain other modifications may be made by those skilled in the art to modify the invention without departing from the spirit of the invention.

The inventor claims:

1. A spring loaded sprocket carrier comprised of:
   a. a sprocket holder;
      wherein the sprocket holder provides a plurality of rectangular openings;
      wherein each of the rectangular openings are of a predetermined size;
      a center opening;
      a plurality of elliptical openings;
      wherein each of the elliptical openings are of a predetermined size;
      a plurality of through-holes;
   b. a first flange;
      wherein the first flange has a first side and a second side;
      Said first flange has a plurality of sockets;
      wherein each of the sockets are of a predetermined size;
      wherein each socket extends outward from the second flange;
      wherein each socket is able to fit within each elliptical opening;
      said first flange has a plurality of recesses;
      wherein each recess is provided on the second side of the first flange;
      wherein the first flange provides a hollow protrusion that extends outward from the second side;
      wherein said protrusion provides an exterior surface and an interior surface;
      wherein said exterior surface of said protrusion is cylindrical;
      wherein a keyway is positioned on the interior surface of the said protrusion;
   c. a second flange;
      wherein the second flange provides a first side and a second side;
      wherein the first side of the second flange provides at least one recess;
      said second flange has a circular opening;
      said second flange has a plurality of through-holes;
   d. a plurality of shock absorbers;
      wherein each shock absorber fits within each recess of the first flange;
      wherein each shock absorber fits within each recess of the second flange;
      wherein each shock absorber fits within each rectangular opening of the sprocket holder;
   e. a plurality of bolts;
      wherein each bolt is of a predetermined size.

2. The spring loaded sprocket carrier as described in claim 1, wherein each of the bolts fit through each of the through-holes of the second flange.

3. The spring loaded sprocket carrier as described in claim 1, wherein each of the bolts thread into each of the sockets.

4. The spring loaded sprocket carrier as described in claim 1, wherein each of the bolts fit through each of the through-holes of the sprocket holder in order to secure the sprocket.

5. The spring loaded sprocket carrier as described in claim 1, wherein the shock absorber is a spring.

6. The spring loaded sprocket carrier as described in claim 1 wherein the shock absorber is a foam material.

7. The spring loaded sprocket carrier as described in claim 1 wherein the shock absorber is a rubber material.

8. A spring loaded sprocket carrier comprised of:
   a. a sprocket holder;
      wherein the sprocket holder provides a rectangular opening;
      wherein the rectangular opening is of a predetermined size;
      said sprocket holder has a center opening;
      said sprocket holder has a plurality of elliptical openings;
      wherein each of the elliptical openings are of a predetermined size;
      said sprocket holder has a plurality of through-holes;
   b. a first flange;
      wherein the first flange has a first side and a second side;
      said first flange has a plurality of sockets;
      wherein each of the sockets are of a predetermined size;
      wherein each socket extends outward from the second flange;
      wherein each socket is able to fit within each elliptical opening;
      said first flange has a recess;
      wherein the recess is provided on the second side of the first flange;
      said first flange provides a hollow protrusion that extends outward from the second side;
      wherein said protrusion provides an exterior surface and an interior surface;
      wherein said exterior surface of said protrusion is cylindrical;
      wherein a keyway is positioned on the interior surface of said protrusion;
   c. a second flange;
      wherein the second flange provides a first side and a second side;
      wherein the first side of the second flange provides a recess;
      said second flange has a circular opening;
      said second flange has a plurality of through-holes;
   d. a shock absorber;
      wherein the shock absorber fits within the recess of the first flange;
      said shock absorber fits within the recess of the second flange;
      said shock absorber fits within the rectangular opening of the sprocket holder;
   e. a plurality of bolts;
      wherein each bolt is of a predetermined size.

9. The spring loaded sprocket carrier as described in claim 8, wherein each of the bolts fit through each of the through-holes of the second flange.

10. The spring loaded sprocket carrier as described in claim 8, wherein each of the bolts thread into each of the sockets.

11. The spring loaded sprocket carrier as described in claim 8, wherein each of the bolts fit through each of the through-holes of the sprocket holder in order to secure the sprocket.

12. The spring loaded sprocket carrier as described in claim 8, wherein the shock absorber is a spring.

13. The spring loaded sprocket carrier as described in claim 8 wherein the shock absorber is a foam material.

14. The spring loaded sprocket carrier as described in claim 8 wherein the shock absorber is a rubber material.

\* \* \* \* \*